(12) United States Patent
Badger et al.

(10) Patent No.: X9269
(45) Date of Patent: Nov. 30, 1835

(54) FORGE, HEARTH, HOT AIR

(76) Inventors: Leonidas V. Badger; Richard Walker

Leonidas C. Badger of Portsmouth N. H.

Letters Patent

The Schedule referred to in these Letters Patent and making part of the same containing a description in the words of the said Leonidas C. Badger himself of his improvement in the Hot air and Cupola Furnace To all to whom these presents shall come. Be it known that I Leonidas C. Badger of Portsmouth in the County of Rockingham and State of New Hampshire, has invented constructed and applied to use a new and useful improvement called the Hot air Cupola Furnace, of which the following is a full and exact description The furnace consists of two conical cylinders about four feet ten inches in height. the bottom end of one three feet diameter. the top two feet, the other one inch in diameter less, having a space when placed on the bottom of about one inch. The bottom is arranged in the usual way of common Cupola furnaces. on the top of cylinder or body of furnace is a ring projecting with a moulding running back four inches the thickness of the Brick lining to receive the two cylinders which I call the hot air cylinders, these are to be arranged that the outside shall be on a line with the furnace body, and shall be half the height of the same, one other cylinder of the same length. four inches less in diameter to be placed on a rim on the inside leaving a chamber for the air of four inches in the clear, which being the same as the thickness of the Brick lining, will leave the regularity of the cone on the interior of the furnace equal and perfect. On the top of these air chamber cylinders is to be a ring filled with the moulding. on the interior of this air chamber, is a Spiral Plate running entirely around several times leaving the distance between of about four inches making in reality a circuitous pipe of four inches square, or it may be divided by partitions or any other mode that will give the continuous chamber for the air. on the back side of the cylinder at the upper end a hole is to be cast for the Bellows pipe to be connected; at the two opposite sides. on the bottom edge two holes are left for the supply pipes which end in air tight chests. These

[illegible]

the hinges to the sides of the furnace. The pipe at the end which enters
the chest is to be turned to fit tight that all variations in the whole works
caused by contraction and expansion of the metal may be overcome.
The whole may be made of cast or sheet iron, and secured together
by bolts. The model I have made with the body formed of one
cylinder to shew more readily the mode arranging the pipes &c. or it
may be used with a single cylinder, the whole furnace is to be secu
red on a foundation in the usual way. What I claim as my inven
tion is the double cylinder at the top of the furnace forming a circu
ilous chamber for the air heating the blast from the flame of the
furnace thereby causing a great saving of fuel and time. Also
I claim the double cylinder to the body of furnace preventing the
escape of the heat by the confined air between the two cylinders Exd
W.G.C.
Witnesses
Brackett Hutchings
W. H. [illegible] Hackett L. V. Badger (630 Words)

(Patented 2 Decr 1835)
[illegible]

L. Badger and Richard Walker of Portsmouth N.H.
Letters Patent

The Schedule referred to in these Letters Patent and making part of the same. containing a description in the words of the said L.V. Badger and Richard Walker themselves of their improvement on the Hot air Forge hearth.

To all to whom these presents shall come

Be it known that We Richard Walker and Leonidas V. Badger of Portsmouth in the County of Rockingham and State of New Hampshire have invented constructed and applied to use a new and useful improvement called the Hot air Forge Hearth. Our invention consists of a case or box running under and up the front of the forge making about one foot square for hearth and the same for front the distance from the hearth and front to the back and bottom should be about two and a half or three inches the box to be closely fitted with cement the interior of box is filled with partitions leaving a space between of about two inches, causing the blast or wind to pass from one to the other continuously making a distance of eight feet in the size box described above, the air by taking a circuitous rout under the hearth and in front of fire becomes intensely heated, thereby making a great saving of fuel, the hearth should be placed about three inches below the surface of brick work for a receptacle for the fire, ashes, cinders &c.

What We claim as our improvement is the passing the wind under and back of the fire making a complete hot air blast.

Witnesses
Backitt Hutchings
W. H. Y. Hackett

L. V. Badger
Richard Walker

Exd
1196.

(300 words)

(Patented Nov. 30. 1835)

(Drawing)

United States Patent
Patent No.: X9269
L. V. BADGER.
Cupola Furnace.
Patented Dec. 2, 1835.
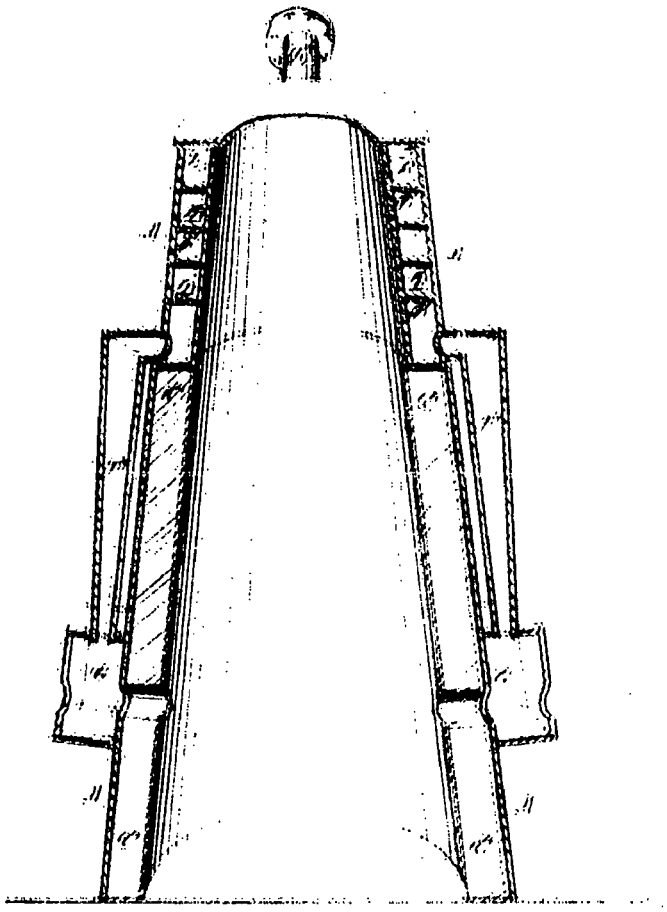

United States Patent
Patent No.: X9269
*Badger & Walker,*
*Forge Hearth,*
*Patented Nov. 30, 1835.*
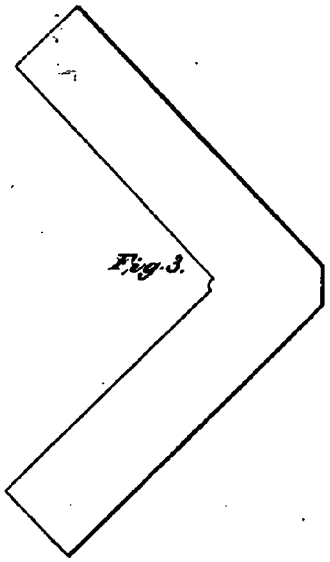
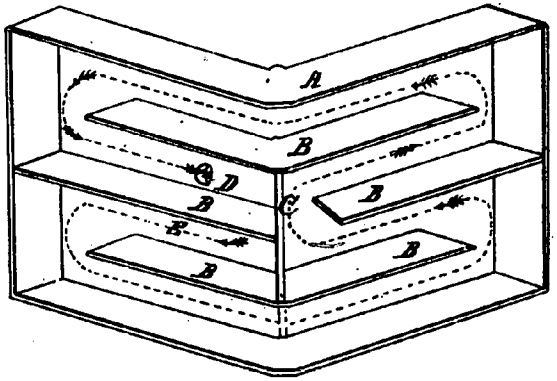
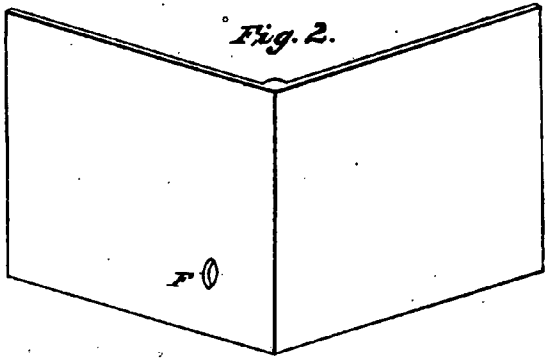
S. PETERS, PHOTO-LITHOGRAPHER, WASHINGTON, D. C.